United States Patent [19]

Sudoh et al.

[11] 4,404,031

[45] Sep. 13, 1983

[54] PROCESS FOR PRODUCING HYDRAULIC CEMENTS

[75] Inventors: Giichi Sudoh, Chichibu; Keiichi Minegishi, Kumagaya; Kanjiro Ishizaki; Ikuo Uchida, both of Chichibu, all of Japan

[73] Assignee: Chichibu Cement Kabushikikaisha, Tokyo, Japan

[21] Appl. No.: 336,689

[22] Filed: Jan. 4, 1982

[30] Foreign Application Priority Data

Apr. 2, 1981 [JP] Japan .................................. 56-48378

[51] Int. Cl.³ ............................................. C04B 7/14
[52] U.S. Cl. ........................................ 106/90; 106/104; 106/117
[58] Field of Search .................... 106/89, 104, 117, 90

[56] References Cited

U.S. PATENT DOCUMENTS

| | | | |
|---|---|---|---|
| 3,997,353 | 12/1976 | Chervenka et al. | 106/89 |
| 4,082,561 | 4/1978 | Nakagawa et al. | 106/89 |
| 4,266,980 | 5/1981 | Chudo et al. | 106/117 |
| 4,310,358 | 1/1982 | Azuma et al. | 106/117 |

*Primary Examiner*—James Poer
*Attorney, Agent, or Firm*—Holman & Stern

[57] ABSTRACT

A calcium sulfoaluminate clinker having a calcium sulfoaluminate compound $3CaO.3Al_2O_3 \cdot CaSO_4$ as a main component, a Portland cement and a blast furnace granulated slag are mixed to produce cements which prevent the formation of efflorescence.

2 Claims, 1 Drawing Figure

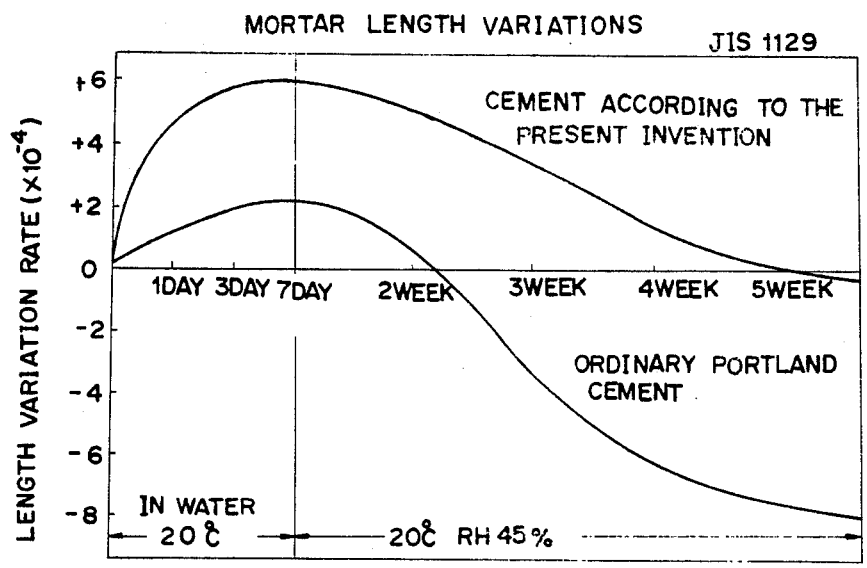

PROCESS FOR PRODUCING HYDRAULIC CEMENTS

BACKGROUND OF THE INVENTION

1. Field of the Invention

This invention relates to a process for producing hydraulic cements which prevent formation of efflorescence while providing a unique cement of fancy finishes of building and which develop the same strength and surface hardness as of Portland cements.

2. Description of the Prior Art

It is already known that not only a gel (C—S—H gel) of a calcium silicate hydrate which is a main product but also calcium hydroxide [$Ca(OH)_2$] is produced in a process wherein a Portland cement having as a main component such calcium silicate as Tricalcium silicate ($3CaO.SiO_2$) or dicalcium silicate ($2CaO.SiO_2$) is kneaded with water and is then coagulated and set.

In the case of an ordinary Portland cement containing, for example, 50% by weight of tricalcium silicate ($3CaO.SiO_2$) and 25% by weight of dicalcium silicate ($2CaO.SiO_2$), 30 parts of calcium hydroxide [$Ca(OH)_2$] will be produced per 100 parts of the original cement. The calcium hydroxide frequently will appear as a white deposit called an efflorescence on the surfaces of not only various concrete products but also structures finished with plastered mortars and cement series sprayed materials. Such deposits appear as white dirty specks which spoil the beautiful appearance of the surfaces.

Such efflorescence can be divided into a primary efflorescence and a secondary efflorescence depending on the time of its generation.

The primary efflorescence is seen in the initial period of setting and will occur when calcium hydroxide [$Ca(OH)_2$] or the like, kneaded and dissolved in water, moves into a cement paste setting body having not yet well set and having many air gaps and is deposited on the surface. The secondary efflorescence will occur when, after the completion of the setting, rainfall or underground water is absorbed and is then carried to the surface with the drying and dissolved calcium hydroxide $Ca(OH)_2$ deposited on the surface.

Further, the efflorescence may occur due to other causes than calcium hydroxide $Ca(OH)_2$ produced by the hydrating reaction of a cement. For example, it may occur when the amount of an alkali component $Na_2O$ or $K_2O$) in the cement is large, when sea water or sea sand is used for kneading water or aggregate, respectively, or when the concrete structure is partly embedded in the ground and underground water with a high inorganic salt concentration rises through the concrete structure. The composition of such efflorescence may be attributed to hydrous salt compounds such as $Na_2SO_4$, $K_2SO_4$, $Na_2CO_3$, $K_2CO_3$, $CaSO_4$ or $CaCO_3$.

The efflorescence of a cement or particularly the efflorescence caused by calcium hydroxide [$Ca(OH)_2$] is very difficult to prevent because the production of $Ca(OH)_2$ is an essential phenomenon of the hydrating reaction of a Portland cement. There has already been attempted, for example, a method wherein air gaps within a concrete are filled with a fine mineral powder to control the movement of calcium hydroxide [$Ca(OH)_2$] or a method wherein a material containing active silica or active alumina likely to react with $Ca(OH)_2$ is added to be subsequently fixed as an insoluble hydrate in the form of a calcium silicate hydrate ($CaO—SiO_2—H_2O$ series) or calcium aluminate hydrate ($CaO—Al_2O_3—H_2O$ series). However, the efflorescence can not be totally eliminated such methods.

The present invention is a process for producing hydraulic cements which can positively prevent the generation of an efflorescence by eliminating such states as are mentioned above.

QUALITY, OBJECTS AND CONTENTS OF THE INVENTION

An object of this invention is to produce a process for preparing cements which prevent an efflorescence by a unique cement providing fancy finishes for buildings.

Another object of this invention is to develop the same strength and surface hardness as Portland cements.

A further object of this invention is a process for producing cements which are quick strong and are high in elongation strength and are durable.

A further object of this invention is a process for producing cements which can adjust the coagulating time of the cement to be as long as that of an ordinary Portland cement.

A further object of this invention is a process for producing cements which have low pH values, are non-shrinkable and have reduced dry shrinkage.

BRIEF DESCRIPTION OF THE DRAWING

The drawing is a graph showing the length variation of a mortar.

DETAILED DESCRIPTION OF THE INVENTION

The present invention is to mix a first raw material which is 3 to 20% by weight of a clinker or cement having as a main component of calcium sulfoaluminate compound or calcium aluminate compound having a mol ratio of $CaO/Al_2O_3$ less than 3 as $3CaO.3Al_2O_3.CaSO_4$, $CaO.Al_2O_3$ or $12 CaO.7Al_2O_3$ as converted to or expressed in terms of a calcium sulfoaluminate compound or calcium aluminate compound, a second raw material which is 3 to 20% by weight of a clinker or cement having as a main component a tricalcium silicate $3CaO.SiO_2$ or dicalcium silicate $2CaO.SiO_2$ as a Portland cement or mixed cement as converted to or expressed in terms of a calcium silicate compound, a third raw material which is 6 to 40% by weight of a gypsum as gypsum anhydride or gypsum dihydrate as converted to or expressed in terms of $CaSO_4$, a fourth raw material which is 20 to 88% by weight of a blast furnace granulated slag and a fifth raw material which is 0.1 to 1.5% by weight of an oxycarboxylic acid such as sodium citrate or malic acid so that a mol ratio of $(3Al_2O_3+1.5SiO_2)/(CaO—SO_3)$ may not be less than 1.

Now, the reason why the cement according to the present invention generates no efflorescence and develops the same physical properties of a Portland cement shall be explained from the viewpoint of a hydrating reaction with reference to an example in which a calcium sulfoaluminate clinker having a calcium sulfoaluminate compound $3CaO.3Al_2O_3.CaSO_4$ as a main component, a Portland cement and a blast furnace granulated slag are used.

The calcium sulfoaluminate compound will form ettringite by reacting with calcium hydroxide and gypsum at the time of the hydration as shown by the following formula:

3CaO.3Al$_2$O$_3$.CaSO$_4$(calcium sulfoaluminate)+8CaSO$_4$(gypsum)+6Ca(OH)$_2$ (calcium hydroxide)+90H$_2$O→3(3CaO.Al$_2$O$_3$.- 3CaSO$_4$.32H$_2$0)(ettringite).

Gypsum anhydride or gypsum dihydrate is consumed for this reaction. On the other hand, calcium hydroxide [Ca(OH)$_2$] produced by the hydrating reaction of a Portland cement is fed as calcium hydroxide [Ca(OH)$_2$].

The Portland cement which is a general stimulant will produce calcium hydroxide [Ca(OH)$_2$], will elevate the pH of the cement, will dissolve out silica (SiO$_2$) and alumina (Al$_2$O$_3$) of the slag, will react with them to produce a calcium silicate hydrate (CaO—SiO—H$_2$O series) and calcium aluminate hydrate (CaO—Al$_2$O$_3$—H$_2$O series) and will further react with gypsum to accelerate the production of a calcium sulfoaluminate hydrate (CaO—Al$_2$O$_3$—CaSO$_4$—H$_2$O series) or the like.

However, in the present invention, as calcium hydroxide [Ca(OH)$_2$] produced from a Portland cement is consumed to hydrate a calcium sulfoaluminate clinker as described later, the amount of the Portland cement is so large as to be 3 to 20% by weight as compared with a general slag series cement.

In order that no efflorescence may be generated, it is very important that the calcium sulfoaluminate clinker, which is another stimulant consumes all of the calcium hydroxide [Ca(OH)$_2$] so that no calcium hydroxide [Ca(OH)$_2$] remains in the system. This reaction is shown by the following formulas:

Calcium sulfoaluminate clinker

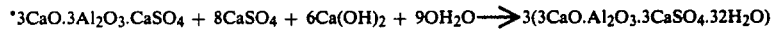

*3CaO.3Al$_2$O$_3$.CaSO$_4$ + 8CaSO$_4$ + 6Ca(OH)$_2$ + 9OH$_2$O ⟶ 3(3CaO.Al$_2$O$_3$.3CaSO$_4$.32H$_2$O)

(calcium sulfoaluminate) (gypsum) (calcium hydroxide) (ettringite)

Portland cement

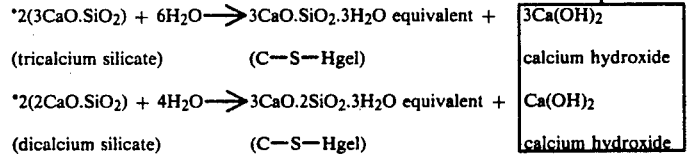

*2(3CaO.SiO$_2$) + 6H$_2$O ⟶ 3CaO.SiO$_2$.3H$_2$O equivalent + | 3Ca(OH)$_2$ (tricalcium silicate)      (C—S—Hgel)                        calcium hydroxide

*2(2CaO.SiO$_2$) + 4H$_2$O ⟶ 3CaO.2SiO$_2$.3H$_2$O equivalent + | Ca(OH)$_2$ (dicalcium silicate)      (C—S—Hgel)                         calcium hydroxide That is to say, there may be made a composition wherein calcium hydroxide [Ca(OH)$_2$] produced by the hydration of tricalcium silicate (3CaO.SiO$_2$) and dicalcium silicate (2CaO.SiO$_2$) in a Portland cement reacts with calcium sulfoaluminate (3CaO.3Al$_2$O$_3$.CaSO$_4$) and gypsum (CaSO$_4$) to produce ettringite.

The hydrating reaction of a calcium sulfoaluminate clinker is quicker than the hydrating reaction of a Portland cement. Therefore, an oxycarboxylic acid or a sodium salt thereof may be added so that the hydrating reaction of the calcium sulfoaluminate clinker may be retarded. The hydrating times of both may coincide with each other; calcium hydroxide [Ca(OH)$_2$] produced from the Portland cement may stimulate the slag and then the excess may be consumed in the hydration of the calcium sulfoaluminate clinker.

Sodium citrate, malic acid, tartaric acid and sodium tartrate are effective as oxycarboxylic acids and sodium salts of oxycarboxylic acids for this purpose.

Calcium hydroxide [Ca(OH)$_2$] produced in the process of hydrating a cement must be finally fixed as a C—S—H gel (3CaO.2SiO$_2$.3H$_2$O equivalent) and ettringite (3CiO.Al$_2$O$_3$.3CaSO$_4$.32H$_2$O).

As the mol ratio of CaO/SiO$_2$ of the C—S—H gel=1.5, the mol ratio of CaO/Al$_2$O$_3$ of the ettringite=3 and a part of the lime part (CaO) of the cement forms gypsum (CaSO$_4$), in case the mol ratio of (3Al$_2$O$_3$+1.5SiO$_2$)/(CaO—So$_3$)≧1, no free calcium hydroxide [Ca(OH)$_2$] will be stoichiometrically present in the system.

Therefore, in order to prevent the efflorescence of a cement for a long time since the initial period, it is a requirement that the mol ratio of (3Al$_2$O$_3$+1.5SiO$_2$)/(CaO—SO$_3$) sould not be less than 1.

As evident from the above description, the cement by the producing process of the present invention has such excellent characteristics that:

(1) No efflorescence is generated for a long time since the initial period;

(2) The surface hardness is high and the defect of a slag series cement that the surface becomes brittle is not seen;

(3) The calcium sulfoaluminate clinker and Portland cement themselves are hydraulic, the slag is hydratable since the initial period and therefore the cement quickly becomes strong and is high in elongation strength for a long time;

(4) The coagulating time of the cement can be made as long as of an ordinary Portland cement by adjusting the added amount of the oxycarboxylic acid;

(5) As no calcium hydroxide [Ca(OH)$_2$] is present, the pH of the cement is low and, as the cement hardly etches glass fibers, it can be used for GRC as a low alkali cement;

(6) The cement is non-shrinkable and is reduced in dry shrinkage.

A medium hot Portland cement can usually be used for the Portland cement. A quick strong (high early strength) or superquick strong (high very early strength) Portland cement having a large amount of tricalcium silicate (3CaO.SiO$_2$) and high in reactivity provides a greater effect of stimulating the slag having a latent hydraulicity. Further, a white Portland cement having tricalcium silicate (3CaO.SiO$_2$) as a main compound can also be used and such mixed cement as a blast furnace cement or fly ash cement can also be used.

Further, in addition to calcium sulfoaluminate, there can also be used such calcium aluminate compound as CaO.Al$_2$O$_3$ or 12CaO.7Al$_2$O$_3$ or an alumina cement having it as a main component. The chemical reaction of consuming calcium hydroxide [Ca(OH)$_2$] in this case is represented by the following formulas:

In the case of $CaO \cdot Al_2O_3$:

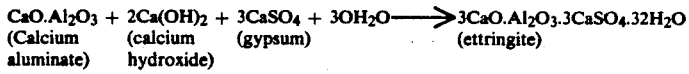

(Calcium aluminate) (calcium hydroxide) (gypsum) (ettringite)

In the case of $12CaO \cdot 7Al_2O_3$:

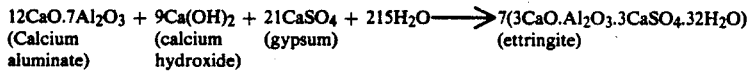

(Calcium aluminate) (calcium hydroxide) (gypsum) (ettringite)

As the calcium aluminate compound ($mCaO \cdot nAl_2O_3$) or calcium sulfoaluminate compound ($mCaO \cdot nAl_2O_3 \cdot CaSO_4$) will consume calcium hydroxide [$Ca(OH)_2$] in the hydrating reaction when the mol ratio of $CaO/Al_2O_3 < 3$, it is a requirement that the mol ratio of $CaO/Al_2O_3$ should be less than 3.

As mentioned above, the cement by the production process of the present invention has such characteristics that it develops the same coagulating characteristic and strength as of a Portland cement and is very effective and appropriate as a cement for buildings or particularly for fancy surface finishes.

Examples of the present invention are provided below;

EXAMPLE 1

8% by weight of a clinker formed of $3CaO \cdot 3Al_2O_3 \cdot CaSO_4$, free lime, free gypsum and dicalcium silicate as a calcium sulfoaluminate clinker, 10% by weight of a white Portland cement, 15% by weight of hard gypsum having gypsum anhydride as a main component and 67% by weight of a blast furnace granulated slag were mixed, were crushed to be of a Blaine value of 4000 $cm^2/g$. and had 0.3% by weight of sodium citrate mixed in to obtain a cement. The mol ratio of $(3Al_2O_3+1.5SiO_2)/(CaO-SO_3)$ was 1.42.

Table 1 shows the coagulation, false coagulation, mortar strength, efflorescence test results and surface hardness of the cement as compared with those of an ordinary Portland cement. The coagulation, false coagulation and mortar strength are according to JIS RJ201 and JAS S5T101.

The method of testing the efflorescence was that the cement was colored by adding 3% of a pigment $Fe_2O_3$ red, a mortar of river sand in 1:3 of a mortar flow of 180 mm. was obtained, was applied to paint 300×300 mm. of a concrete panel base and was immediately exposed to wind of a velocity of 1 meter per second within a wind tunnel at 5° C. and the surface was observed 28 days later.

The surface hardness was measured under a load of 400 g. on the 7th and 28th days of the material age by using a Martens type scratching hardness tester.

TABLE 1
Cement Test Results

| | | False coagulation | | | | Mortar compression strength | | | | | | | |
| | Amount of water of standard softness (%) | Amount of fall (mm) | | Coagulation | | Bending (kg f./cm²) | | | | Compression (kg f./cm²) | | | |
| Kind | | 5 minutes | 10 minutes | Start (Time) | End (Time) | 1st day | 3rd day | 7th day | 28th day | 1st day | 3rd day | 7th day | 28th day |
|---|---|---|---|---|---|---|---|---|---|---|---|---|---|
| Cement according to the present invention | 25.1 | 32 | 27 | 2-35 | 3-40 | 38.1 | 47.5 | 54.9 | 69.7 | 112 | 253 | 350 | 428 |
| Ordinary Portland cement | 27.4 | 33 | 31 | 2-30 | 3-55 | 22.0 | 32.7 | 51.3 | 64.0 | 70 | 131 | 236 | 412 |

| Kind | State of the sample after the efflorescence test | Surface hardness of the set paste (Note) | |
|---|---|---|---|
| | | 7th day | 28th day |
| Cement according to the present invention | No efflorescence was recognized to be generated | 2.55 | 2.68 |
| Ordinary Portland cement | Remarkable efflorescence was generated on the entire surface | 2.58 | 2.62 |

(Note)
The larger the numerical value of the surface hardness, the higher the hardness It is found that, though the cement according to the present invention contains 67% by weight of a blast furnace granulated slag, its coagulating time is as short as of the ordinary Portland cement and its strength on the 1st day is as high as of a quick strong cement. Further, in the efflorescence test, no efflorescence was generated at all. The surface hardness of the set paste was the same as of the ordinary cement.

EXAMPLE 2

8% by weight of an alumina cement containing 78% calcium aluminate $CaO \cdot Al_2O_3$ and 15% $12CaO \cdot 7Al_2O_3$, 14% by weight of a quick strong Portland cement, 22% by weight of a gypsum anhydride powder, 56% by weight of a blast furnace granulated slag powder and 0.5% by weight malic acid were mixed to obtain a cement. The mol ratio of $(3Al_2O_3+1.5SiO_2)/(CaO-SO_3)$ of the cement was 1.53.

In the same manner as in the above mentioned Example 1, the coagulated mortar strength of the cement was measured, the efflorescence was tested and the variation of the mortar length was measured.

The length variation was measured by a comparator method according to JIS A1129. The basic length was the length at the demolding the next day of kneading in. The results are shown in the next Table 2 and the graph of the length variations of the mortar in the accompanying drawing.

TABLE 2

| | Cement Test Results | | | | | |
|---|---|---|---|---|---|---|
| | Coagulation | | | Mortar Strength Compression (kgf/cm$^2$) | | State of the sample after the efflorescence test |
| Kind | Amount of water of standard softness (%) | Start (Time) | End (Time) | 3rd day | 7th day | 28th day |
| Cement according to the present invention | 25.6 | 1-50 | 2-40 | 163 | 297 | 424 | No efflorescence was recognized to be generated |

The coagulating time of the cement was proper and the development of the mortar strength was favorable. The mortar somewhat expanded during the cure in water in the initial period, had then the expansion canceled under the drying condition and developed a non-shrinkage.

What is claimed is:

1. A process for producing hydraulic cements characterized by mixing a first raw material which is 3 to 20% by weight of a clinker or cement having as a main component a calcium sulfoaluminate compound or calcium aluminate compound having a mol ratio of CaO/Al$_2$O$_3$ less than 3 as 3CaO.3Al$_2$O$_3$.CaSO$_4$, CaO.Al$_2$O$_3$ or 12CaO.7Al$_2$O$_3$ when expressed as a calcium sulfoaluminate compound or calcium aluminate compound, a second raw material which is 3 to 20% by weight of a clinker or cement having as a main component a tricalcium silicate 3CaO.SiO$_2$ or dicalcium silicate 2CaO.SiO$_2$ as a Portland cement or mixed cement when expressed as a calcium silicate compound, a third raw material which is 6 to 40% by weight of a gypsum as gypsum anhydride or gypsum dihydrate when expressed as CaSO$_4$, a fourth raw material which is 20 to 88% by weight of a blast furnace granulated slag and a fifth raw material which is 0.1 to 1.5% by weight of an oxycarboxylic acid or sodium salt thereof which is sodium citrate, malic acid, tartaric acid or sodium tartarate so that a mol ratio of (3Al$_2$O$_3$+1.5SiO$_2$)/(CaO—SO$_3$) may not be less than 1.

2. A hydraulic cement composition comprising a first raw material which is 3 to 20% by weight of a clinker or cement having as a main component a calcium sulfoaluminate compound or calcium aluminate compound having a mol ratio of CaO/Al$_2$O$_3$ less than 3 as 3CaO.3Al$_2$O$_3$.CaSO$_4$, CaO.Al$_2$O$_3$ or 12CaO.7Al$_2$O$_3$ when expressed as a calcium sulfoaluminate compound or calcium aluminate compound, a second raw material which is 3 to 20% by weight of a clinker or cement having as a main component a tricalcium silicate 3CaO.SiO$_2$ or dicalcium silicate 2CaO.SiO$_2$ as a Portland cement or mixed cement when expressed as a calcium silicate compound, a third raw material which is 6 to 40% by weight of a gypsum as gypsum anhydride or gypsum dihydrate when expressed as CaSO$_4$, a fourth raw material which is 20 to 88% by weight of a blast furnace granulated slag and a fifth raw material which is 0.1 to 1.5% by weight of an oxycarboxylic acid or sodium salt thereof which is sodium citrate, malic acid, tartaric acid or sodium tartarate so that a mol ratio of (3Al$_2$O$_3$+1.5SiO$_2$)/(CaO—SO$_3$) may not be less than 1.

* * * * *